3,360,130
FILTER PRESS
Fumio Kaga, Osaka, Japan, assignor to Noritake Iron Works Co., Ltd., Osaka, Japan
Filed Sept. 9, 1964, Ser. No. 395,218
3 Claims. (Cl. 210—225)

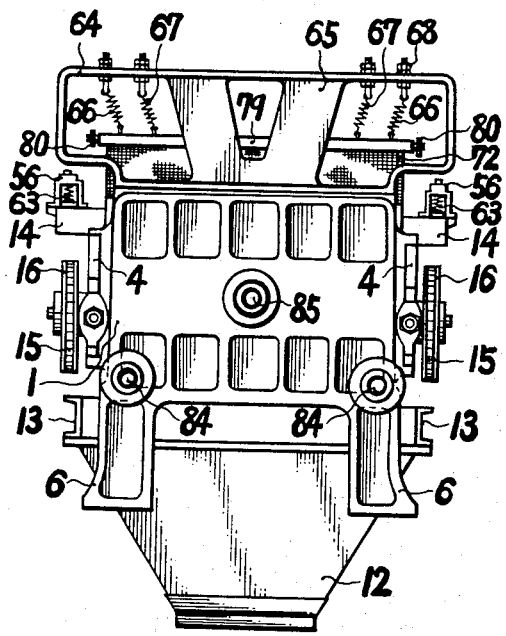
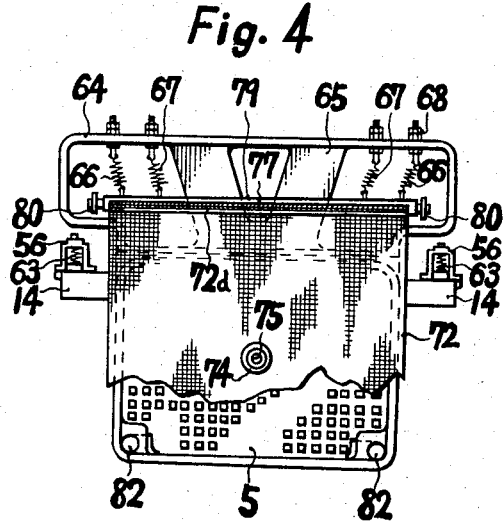
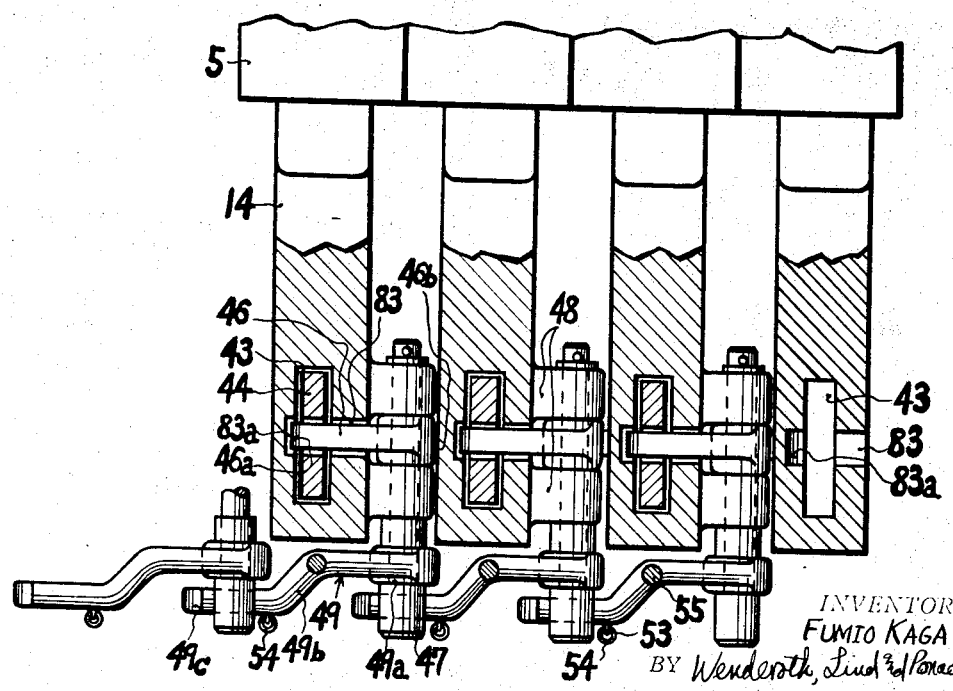

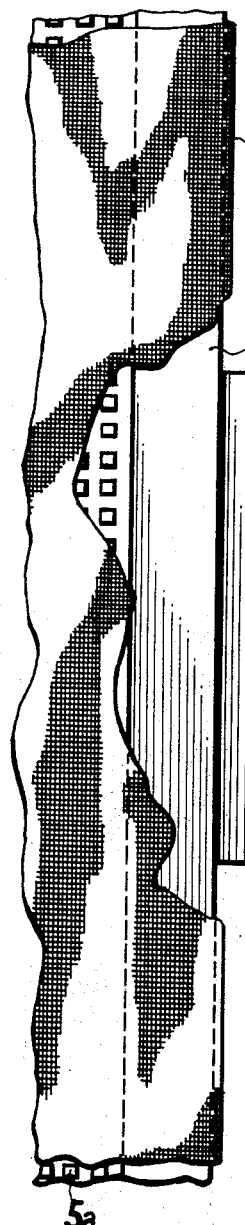
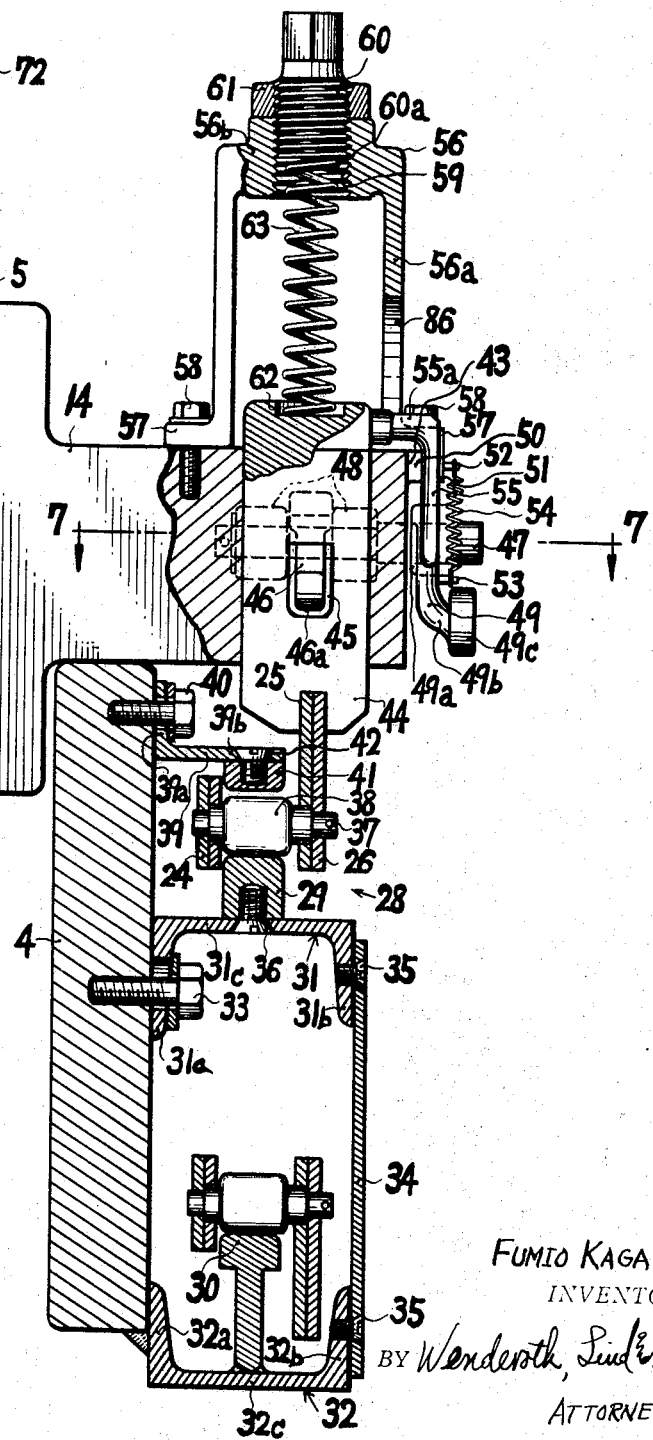
Fig. 6

United States Patent Office 3,360,130
Patented Dec. 26, 1967

ABSTRACT OF THE DISCLOSURE

A filter press having clearing assemblies mounted on filter plate supporting arms with chain driven pawls engaging the clearing assemblies to move the filter plates. The clearing assemblies having spring biased hooks holding adjacent plates together in closed assembly. The hooks are released one at a time by interaction of the pawls and engaging pieces in the clearing assemblies.

---

This invention relates to a filter press, and particularly to an automatic separation mechanism for filter plates or filter plates and frames.

Included under filter presses are a single type filter press comprising a plurality of filter plates alone and a double type filter press comprising a plurality of filter plates and filter frames in alternate combination, and since the two types are structurally the same, this invention is applicable to both of them. It is to be understood that what is referred to as filter plates in this specification and claims means filter plates alone or both filter plates and filter frames.

A plurality of filter plates are pressed collectively in filtering work that is carried out on a filter press having a plurality of filter plates arranged parallel to each other, and after the material to be filtered has been pressed, the plurality of filter plates must be separated one by one and restored to their normal positions in order to remove cakes staying between filter plates.

A primary object of this invention is to provide a new type of filter press whereby a plurality of filter plates can be separated automatically one by one and restored to their normal positions.

Another object of this invention is to provide an automatic filter plate separation mechanism for a filter press whereby a plurality of filter plates are separated intermittently and at fixed intervals.

Still another object of the invention is to provide a drive chain having a feed pawl to be used in the automatic filter plate separation mechanism.

A further object of the invention is to provide a filter plate for the filter press having on a hanger an engaging piece meshable with the feed pawl for the drive chain.

A still further object of the invention is to provide an engaging piece lifting mechanism wherein the engaging piece rises or falls in accordance with coupling or separation of filter plates.

A still further object of the invention is to provide a filter plate locking mechanism in the filter press whereby automatic separation of each plate will not cause another plate to be moved.

A still further object of the invention is to provide an automatic cake removing mechanism in the filter press whereby filter cakes may be shaken off in conjunction with automatic separation of the filter plates.

In short, the filter press provided by this invention comprises parallel drive chains disposed on the outer sides of a train of filter plates and having feed pawls at fixed intervals, an engaging piece movable up and down and meshable wiht the feed pawl fixed to each filter plate, and a lever actuating the engaging piece which is constantly biased downward by a depressing spring and on which is provided a transversal slot in which the front arm of the lever fits, the rear arm thereof being caused to move up and down in accordance with reciprocal movement of the filter plates through coupling and separation. There is provided on a lever shaft a hook which, drawn by a lift spring, catches a lever shaft disposed in the adjacent front.

To the upper part of each filter plate is vertically secured a spring hanging frame on which a plurality of springs are suspended, a filter cloth made of one sheet of cloth turned back like a reversed U-shape on the top thereof being fitted on both of the filter plates adjacent to each other, and the upper end of the filter cloth being connected to both filter plates in front and rear by means of said spring.

The structure and operation of this invention together with other objects and advantages will be more fully understood from the following detailed description made with reference to the accompanying drawings, wherein:

FIG. 3 is a front view of the filter press shown in FIG. 1;

FIG. 4 is a front view of the filter press equipped with cake removing mechanism with filter cloth partly removed.

FIG. 6 is an enlarged sectional view taken along line 6—6 of FIG. 5; and

FIG. 7 is a sectional view taken along line 7—7 of FIG. 6.

Figure 1:
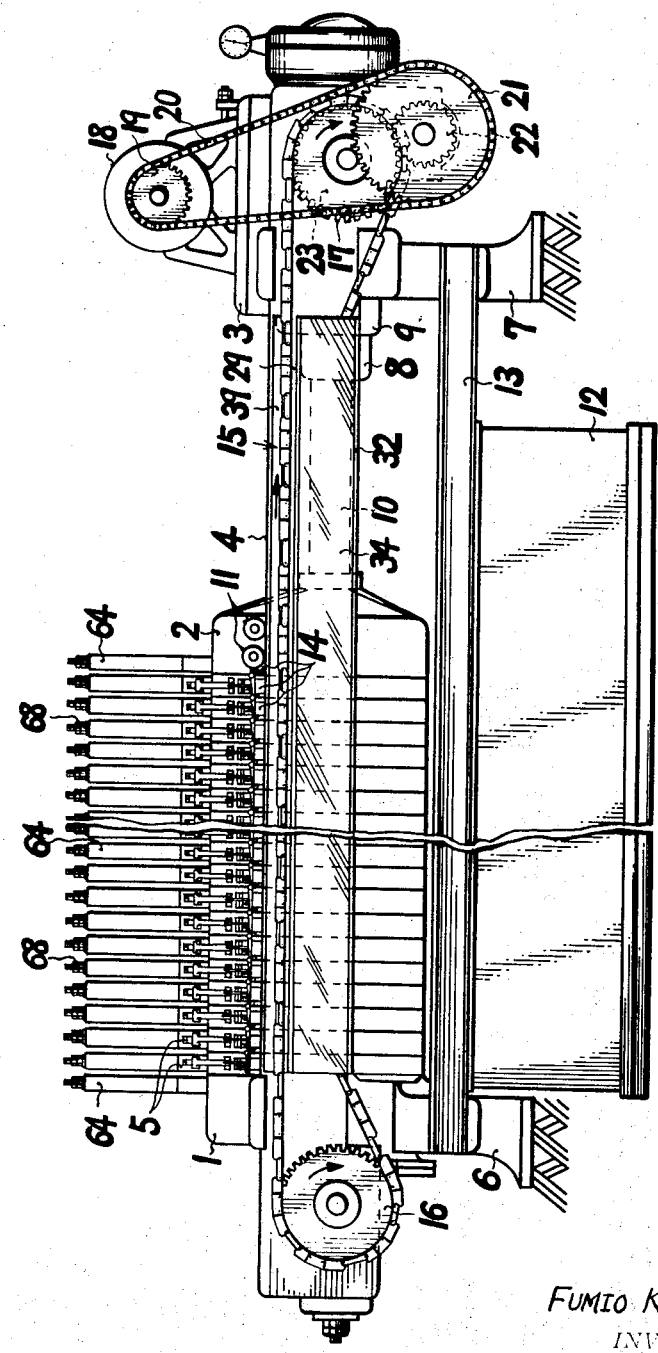
FIG. 1 is a partial side view of a new filter press according to the present invention.

The filter press of this invention shown in FIGS. 1 and 3 comprises a first head 1, a movable head 2, a rear head 3, a pair of side bars or side rails 4 disposed on the right and left sides, and a plurality of filter plates 5. The first head 1 and the rear head 3 include stands 6 and 7. The rear head 3 includes an oil pressure cylinder 9 incorporating a piston 8, and the end of the rod 10 of the piston 8 is secured to the movable head 2. Two rollers 11 are fitted respectively on the upper right and left sides of the movable head 2, which is supported on the surfaces of the side rails 4 and movable back and forth thereon. A cake hopper 12 is fitted inside a pair of U-shaped frames 13 provided endwise and parallel to each other on the outer side of the stands 6 and 7 and is disposed face to face with the underside of a plurality of filter plates. In the middle of the first head 1 is provided a liquid inlet 85 and in the lower end of both sides thereof is a filter liquid outlet 84 (FIG. 3). On the right and left sides of the filter plates 5 are mounted hangers 14, said hangers being disposed on said side bars or side rails 4. Thereby the filter plates 5 are hung so as to be slidable on said side rails.

On the lower side of the right and left hangers 14 and outside of the right and left side bars are spanned a parallel pair of drive chains 15 between front and rear sprockets 16 and 17. The rear sprocket 17 is moved clockwise by a motor 18 through an interlocking device in the form of sprocket 19, chain 20, sprocket 21, and gears 22 and 23. The drive chain 15 comprises conventional chain pieces 24, chain pieces 26 having feed pawls 25 and chain pieces 27 of the same height with feed pawls 25 connected therewith. (See FIG. 5.)

The chain pieces 26 having the feed pawls are disposed at the separated intervals when filter plates are separated to drop off filter cakes staying therebetween. A drive chain guide 28 shown in FIGS. 5 and 6 comprises U-shaped frames 31 and 32 having rails 29 and 30 respectively on the upper surface of said guide and having their upper and lower sides disposed opposite to each other, the inner vertical section 31a of the upper frame 31 being secured to the side bar 4 in the longitudinal direction with a plurality of set screws 33, and the inner vertical section 32a of the lower frame 32 being welded to the side bar 4 at the lower end in the longitudinal direction. The upper and lower ends of a transparent cover plate 34 made of synthetic resin are secured to the outer vertical section 31b of the upper frame 31 and the outer vertical section 32b of the lower frame 32 with a plurality of set screws 35. The rail 29 is secured to the upper surface of the horizontal section 31c of the upper frame 31 with a plurality of set screws 36 from underside, and running on said rail are rollers 38 set in chain piece connecting pins 37 of a drive chain 15. On the upper side of the rollers 38 of the drive chain 15 and on the upper side of the inner chain pieces 24 is provided an L-section cover 39 covering the upper side of those parts, and the vertical section 39a is secured to the upper end of the side bar 4 in the longitudinal direction with a plurality of set screws 40. To the underside of the end of the level section 39b of the cover 39 is secured a rail 41 disposed opposite to the aforementioned rail 29 with a plurality of set screws 42. An underside rail 30 whose section is T-shaped, is welded to the upper surface of the level section 32c of the lower frame 32.

Figure 5:
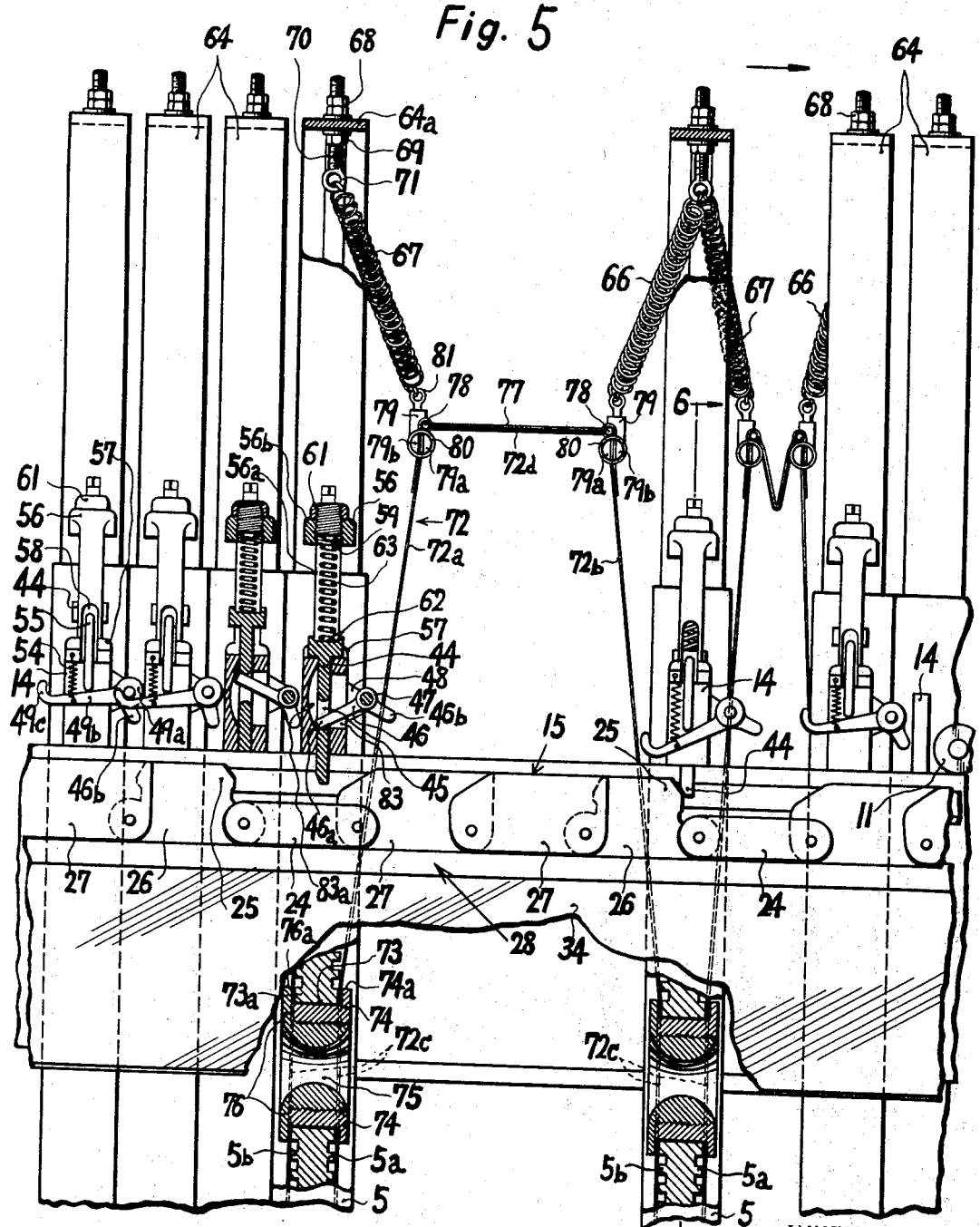
FIG. 5 is an enlarged partial sectional view of an automatic separation mechanism and cake removing mechanism of the filter press shown in FIG. 1.

As shown in FIGS. 5, 6 and 7, the hanger 14 is provided with a longitudinal slit 43 and furthermore with a recess 83 extending from the back side to the front with its bottom 83a concave. An engaging piece 44, T-shaped in vertical section, is inserted in the longitudinal slit 43 and a transversal slit 45 is formed in the middle of the engaging piece 44. In the transversal slit 45 is inserted the front arm 46a of the lever 46 from the recess 83 of the hanger 14 and the rear arm 46b of the lever 46 extends downward toward the rear part of the hanger 14. The shaft 47 of the lever 46 is supported by a shaft bearing 48 protruding from the rear surface of the hanger 14. Slightly inside of the end of this lever shaft 47 is loosely fitted the base 49a of a hook 49 and the hook is bent in the middle 49b outwardly and aslant so that each end 49c of the hook may catch the lever shaft 47 of the filter plate 5 adjacent to and in front of it.

On the lateral side of the upper end of the hanger 14 is provided a convex section 51 having a longitudinal slot 50 in the middle, and a pin 52 is horizontally fixed to the convex section 51 and a pin 53 is horizontally fixed to the outside section slightly back of the end 49a of the hook 49, and between the upper pin 52 and the lower pin 53 is spanned a pull spring 54 which constantly pulls the hook 49 upward. On the outer lateral side of the upper end of the engaging piece 44 is fitted a reverse L-shaped hook depressing bar 55, which has its lower end extending through the slot 50 of the aforementioned convex section 51 to the upper surface of the hook 49. Above the upper part of the longitudinal slit 43 is provided a reverse U-shaped spring receptacle 56 and level lugs 57 on the right and left sides of the lower end of the receptacle are secured to the upper surface of the hanger 14 with set screws 58. In the middle of the outside vertical section 56a of the spring receptacle 56 is provided a longitudinal slot 86 which allows the level section 55a of the hook depressing bar 55 to move up and down. The level section 56b on the upper end of the spring receptacle 56 is formed thick, and in the middle of the level section 56b is provided an internal thread 59 into which an adjustable screw stock 60 is screwed and the adjustable screw stock is then tightened with a nut 61. A concave spring bearing 62 is formed on the engaging piece 44 and a push spring 63 is supported by the spring bearing 62 and the underside 60a of the adjustable screw stock 60.

To the respective tops of the first head 1, the filter plate 5 and the movable head 2 is secured a nearly rectangular spring hanging frame 64. In the middle of this frame 64 is provided a V-shaped reinforcement frame 65 on the right and left sides of which the upper end of springs 66 and 67 for fixing front and rear filter cloths are fixed to a hanging ring 71 attached to the underside of the adjustable screw stock 70 piercing through the top 64a of the frame 64 and which is secured with nuts 68 and 69 in the upper and under sides of the frame 64.

As shown in FIGS. 3 and 5, filter cloth 72 is formed of one sheet of cloth common to adjacent filter plates 5 and 5 and folded back in a reverse U-shape. A front sheet 72a covers the concavo-convex back side 5a of the filter plate 5 and a rear sheet 72b covers the concavo-convex front side 5b of the filter plate 5. In the middle of the filter plate 5 is bored a hole 73 and corresponding holes 72c each are bored in the front sheet 72a and the rear sheet 72b of the filter cloth 72. Firstly an internal thread member 74 is fitted in the hole 73 of the filter plate 5, then an external thread member 76 is screwed thereinto, the external thread member 76 having a liquid inlet 75 which narrows towards the center of the filter plate so that the filter cakes will split at the narrow point when the filter plates are separated and drop easily from the inlet, and the front side 72a of the filter cloth 72 and the rear side 72b thereof respectively are fixed in the middle of the filter plates 5 by tightening the flange 74a of the internal thread member 74 and the flange 76a of the external thread member 76 applied to the brim 73a of the hole 73. The upper side 72d of the filter cloth 72 is covered by filter cloth reinforcement material 77 made of a material such as flat leather covering the upper surface and part of the front and rear sides of the filter cloth 72. At the front and rear ends of the upper part 72d of the filter cloth 72 an iron bar 78 having the width of the filter cloth is sealed between the filter cloth 72 and the filter cloth reinforcement material 77. At the upper ends of the front sheet 72a and rear sheet 72b of the filter cloth 72 are fitted metal connection fittings 79 each connecting the filter cloth with the springs 66 and 67, the metal connection fitting being fixed by setting a stop ring at either end of the two inside and outside members 79a and 79b whose lengths slightly exceed the width of the filter cloth and between which the filter reinforcement cloth is sandwiched. At the upper end of the metal connection fitting 79 is provided a ring 81 to which the lower ends of springs 66 and 67 respectively are fastened.

A filter cloth liquid outlet 82 is provided in both corners of the lower end of the filter plate 5.

Figure 2:
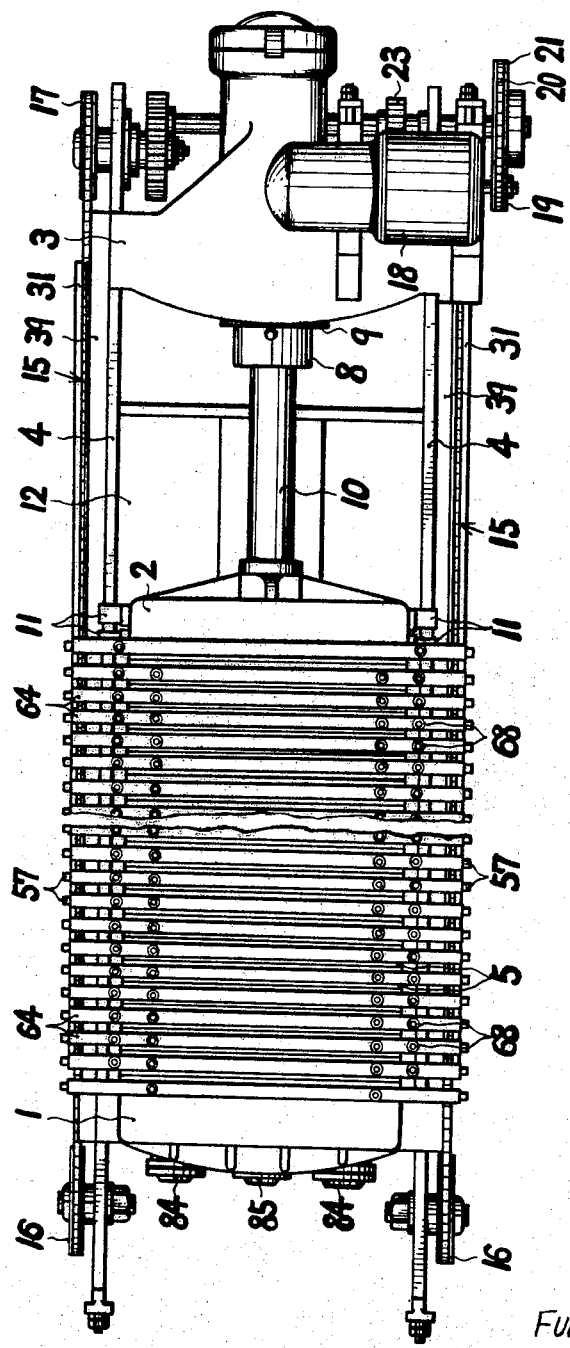
FIG. 2 is a partial plan view of the filter press shown in FIG. 1.

The apparatus of the invention works in the following manner. In FIGS. 1 and 2 filter plates 5 and movable head 2 are in a position of pressing. In this position each hanger 14 of filter plates 5 and movable head 2 thrusts itself against the rear arm 46b of the lever 46 and depresses the rear arm 46b centering around the lever shaft 47, with the result that the front arm 46a of this lever 46 raises the engaging piece 44 against the recoiling power of a push spring 63 and places the lower end thereof in a high position in which the lower end does not thrust itself against a feed pawl 25 of the chain piece 26 of a drive chain 15 and two chain pieces 27 of the same height with its succeeding feed pawl 25. At this time a hook depressing bar 55 is also raised by the engaging piece 44 cooperatively and the hook 49 is released so that the hook 49 springs up, drawn by a pull spring 54, and the end 49c of the hook 49 hangs on the front end of the lever shaft 47. Consequently, one filter plate 5 is successively connected with another filter plate by means of the hook 49.

When the pressing and filtering stage of the process is over and the movable head 2 is moved backward by a piston 8, the rear arm 46b of the lever 46 of the first filter plate 5 in the rear is released, so that the supporting power of the front arm 46a acting on the engaging piece 44 is lost and in consequence the recoiling power of a push spring 63 works on lowering the engaging piece 44, extending its lower end toward the underside of the hanger 14. At the same time a hook depressing bar 55 is lowered and depresses a hook 49 against the power of a pull spring 54, so that the end 49c of the hook 49 is separated from the lever shaft 47 of the second filter plate 5, thereby the connection of the first filter plate 5 with the second filter plate 5 being cut off to put the former in a movable state. The push spring 63 and the pull spring 54 are so made that the former is stronger in spring power than the latter.

When the recession of the movable head 2 is over, a motor 18 is energized to move sprockets 16 and 17 on the right and left sides respectively in a clockwise direction, thereby the upper side of both drive roller chains 15 positioned parallel to each other and located on the outer sides of the side bars or side rails 4 on the right and left sides respectively are guided by a rail 29 and moved toward the right as shown in FIG. 1. Then the feed pawl 25 of the drive chain 15 thrusts itself against the lower end of the engaging piece 44 which was earlier lowered and catches the lower end and pushes it, thereby separating the first filter plate 5 from the second filter plate 5 and moving the first filter plate 5 to a position where it abuts against the movable head 2 that was moved backward and is brought to a standstill in the rear.

As filter cakes which stayed between filter plates 5 in the pressing stage of process are sticky, the second filter plate is stuck to the first plate 5 through filter cakes therebetween and tends to recede together with the first filter plate 5 when the filter plates are operated in the manner described above. This is because the rear arm 46b of the lever 46 of the second filter plate 5 is disengaged by the filter plate 5 moving slightly, thereby the support given the engaging piece 44 by the front arm 46a is lost and consequently the engaging piece 44 is lowered to disconnect the hook 49. If the filter plate 5 that is to be moved back is not separated exactly from the second filter plate, filter cakes of which descriptions will be given hereafter will not be removed in a perfect state. Two chain pieces 27 succeeding a feed pawl 25 and which are the same height therewith prevent the engaging piece 44 of the second filter plate 5 from lowering and consequently preclude the incidental moving of said filter plate 5.

The rear arm 46b of the lever 46 of the thus moved first filter plate 5 thrusts itself against the hanger 14 of the movable head 2 and lowers, while the front arm 46a is raised by the reaction caused by the just described thrust of the rear arm 46b against the hanger 14 of the movable head 2 and the engaging piece 44 is hung up, so that the engaging piece 44 is disengaged from the feed pawl 25 of the drive chain 15 and the first filter plate 5 is brought to a halt in a position where it abuts the movable head 2 (See FIG. 5).

The engaging piece 44 of the second filter plate 5 is held in raised position by the chain piece 27 while the first plate 5 is separated far enough from the second filter plate 5 as to break the junction due to sticky filter cakes therebetween and when said chain piece 27 has finished passing under the engaging piece 44, the engaging piece 44 lowers, and the next feed pawl 25 thrusts itself against said engaging piece 44 and the second filter plate 5 is separated from the third filter plate 5 and is moved to a position, where it abuts against the first filter plate 5 that was earlier moved backward, and is brought to a halt.

The operation described above is repeated successively between the filter plates 5, and the plates are separated one after another. The relationship between the engaging piece 44 and the lever 46 is adjusted in such a manner that suitable clearance is provided between the movable head 2, the filter plate 5 and its succeeding filter plates respectively, when the filter plates are in a halted position. The clearance is provided so as to prevent shocks between the filter plates.

In a state in which the filter plates 5 abut against each other, filter cloth 72 is suspended vertically by springs 66 and 67, and the front sheet 72a and the rear sheet 72b of the filter cloth 72 respectively run along the concavo-convex backside surface 5a of the front filter plate 5 and the concavo-convex front side surface 5b of the rear filter plate 5. When the filter plates 5 are moved apart one after another by the feed pawl 25 of a drive chain 15 after pressing is over, the top end of the filter cloth 72, as shown in FIG. 5, is stretched by front and rear springs 67 and 66 drawn aslant in such a manner that the front sheet 72a and the rear sheet 72b form a slant between the front and rear filter plates 5 and 5 being separated while at the same time the vibration of springs 67 and 66 caused by the moving of the rear filter plate 5 is conducted to the front sheet 72a and the rear sheet 72b of the filter plate 72, whereby cohered filter cakes are shaken off.

When the rear filter plate 5 is sufficiently separated from the front filter plate 5, the top of the filter cloth 72 is stretched horizontally and consequently a vibrational means may be additionaly provided whereby strong forced vibration is induced by tapping and may be transmitted to the top 72a of the filter cloth in case the quality of cakes make it hard for the cakes to be shaken off the filter cloth 72.

As described above, the filter plates 5 are automatically separated and moved backward one after another from the position in which the press is operated, and filter cakes are automatically removed in conjunction with the backward movement of the filter 5, whereby filtering efficiency is greatly improved.

Description being made of the invention as above, it is apparent that this invention is not limited to the foregoing description alone wherein a single type filter press comprising filter plates alone is illustrated with reference to the drawings but that the benefits and advantages of the invention may be derived from provision of the aforementioned engaging piece lifting mechanism on the filter plates and frames thereof in the case of a double type filter press having a plurality of filter plates and frames each in alternate combination.

I claim:

1. A filter press comprising a fixed first head, a fixed rear head, a movable head disposed therebetween, a plurality of plate elements and filter cloths alternately arranged in parallel between said first head and said movable head, said plate elements and said movable head having hangers protruding horizontally from both sides thereof, side rails extending between both sides of said first head and both sides of said rear head and on which said hangers are slidable, drive chains having feed pawls at fixed intervals parallelly arranged below said hangers on the outer sides of both side rails, said hangers each being provided with a longitudinal slot and a recess that extends from the rear part to the front part, an engaging piece in said longitudinal slot, a reverse L-shaped hook depressing bar on the outer lateral side of the engaging piece, the engaging piece having a transverse slot in the middle, said engaging piece being arranged to be stopped at the upper edge of the longitudinal slot when the engaging piece is lowered, a lever shaft on the rear part of each of said hangers, a lever having a front arm and a rear arm at an obtuse angle to each other is swingably fitted on the lever shaft, the front arm of said lever extending into the transverse slot of the engaging piece and engageable with the edge of said transverse slot, the rear arm of said lever protruding behind the hanger and engageable with the next adjacent plate so as to raise the engaging piece to its highest point when the adjacent plates are abutting, a reverse U-shaped spring receptacle having an outer vertical part with a longitudinal slot therin, the hook depressing bar having a horizontal part movable up and down in the upper part of the longitudinal slot of the hanger and operatively connected to the engaging piece, a push spring between the lower surface of the top part of said spring receptacle and the upper surface of the engaging piece, the hook depressing bar of the engaging piece protruding outwardly from said spring receptacle, a hook loosely fitted at the end of the lever shaft, a pull spring extending between said hook and the upper end of the lateral side of each of the hangers, said pull spring being weaker than the said spring pushing against the engaging piece so that the hook catches the lever shaft of the next adjacent plate element when the engaging piece is raised by he lever, the hook depressing bar of the engaging piece being above the upper surface of said hook.

2. A filter press as claimed in claim 1 in which said reverse U-shaped receptacle has a threaded hole in the transverse upper portion thereof, a spring adjusting screw in said threaded hole, said push spring being engaged with the lower end of said spring adjusting screw, the upper surface of said engaging piece having a concave recess in the upper surface thereof in which the other end of said spring is engaged, said hanger having a projection, a pin in said projection, said hook having an outwardly curved section at about the middle thereof, and a further pin at the end and on the outside of the hook from the hanger, said pull spring extending between said pins.

3. A filter press as claimed in claim 1 further comprising cake removing mechanism by which to remove filter cakes from the filter cloth and comprising a spring hanging frame secured to the tops of the first head, each of the filter plates and the movable head, and at least two swingable filter cloth fitting springs suspended from the top of each of said frames, the filter cloth on the back side of one filter plate and filter cloth on the front side of the next adjacent filter plate being connected with each other at the upper ends thereof, each filter cloth being fixed to the two springs on the respective frames, and filter cloth fitting means connecting each filter cloth to the respective filter plate at a position at least as low as the middle thereof.

References Cited

UNITED STATES PATENTS

| | | | |
|---|---|---|---|
| 447,024 | 2/1891 | Coes et al. | 210—231 |
| 2,932,399 | 4/1960 | Emele | 210—225 |
| 3,153,630 | 10/1964 | Green | 210—230 |
| 3,232,435 | 2/1966 | Fismer | 210—236 X |
| 3,289,844 | 12/1966 | Emele | 210—230 X |

REUBEN FRIEDMAN, *Primary Examiner.*

C. M. DITLOW, *Assistant Examiner.*